Patented Dec. 2, 1947

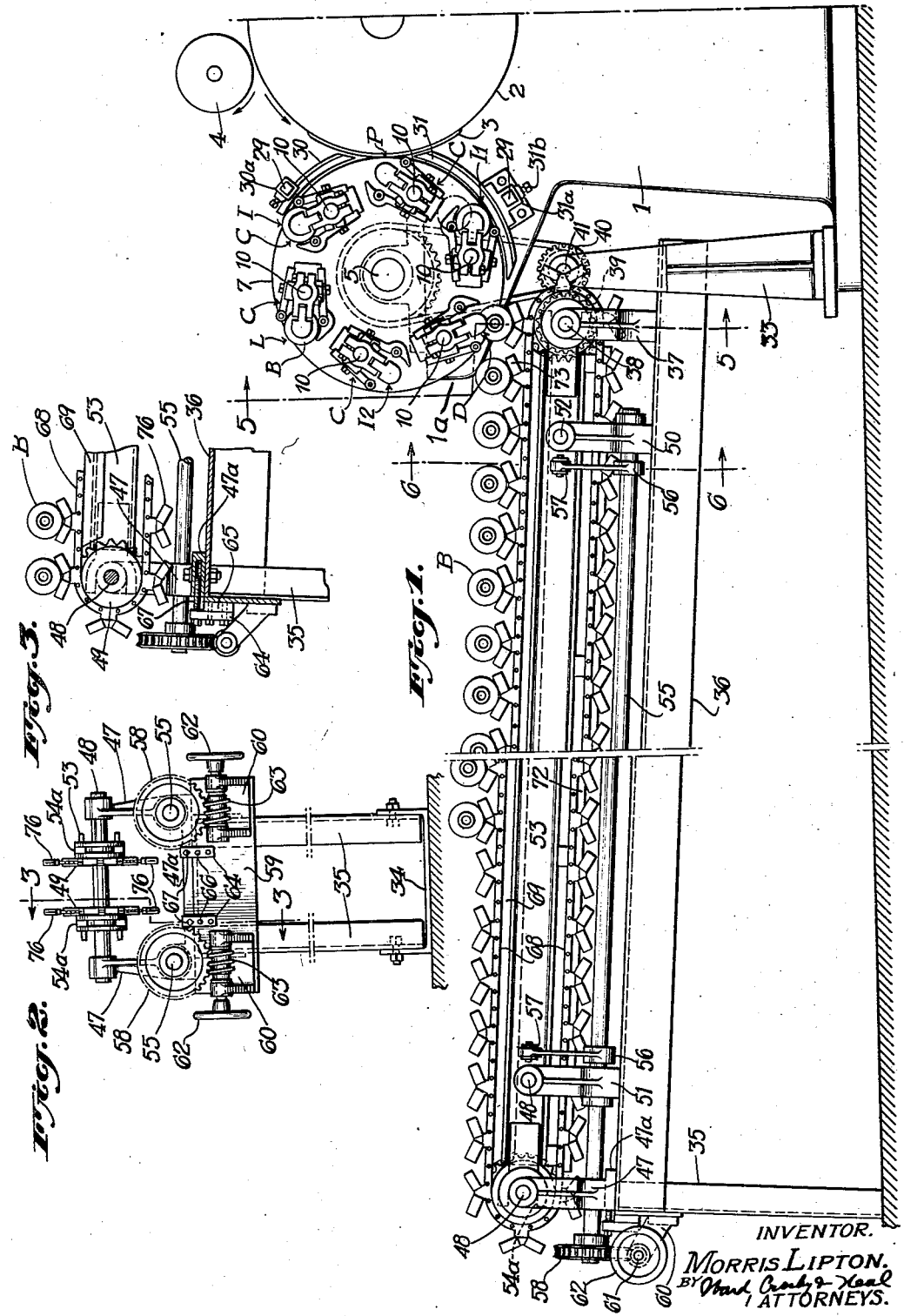

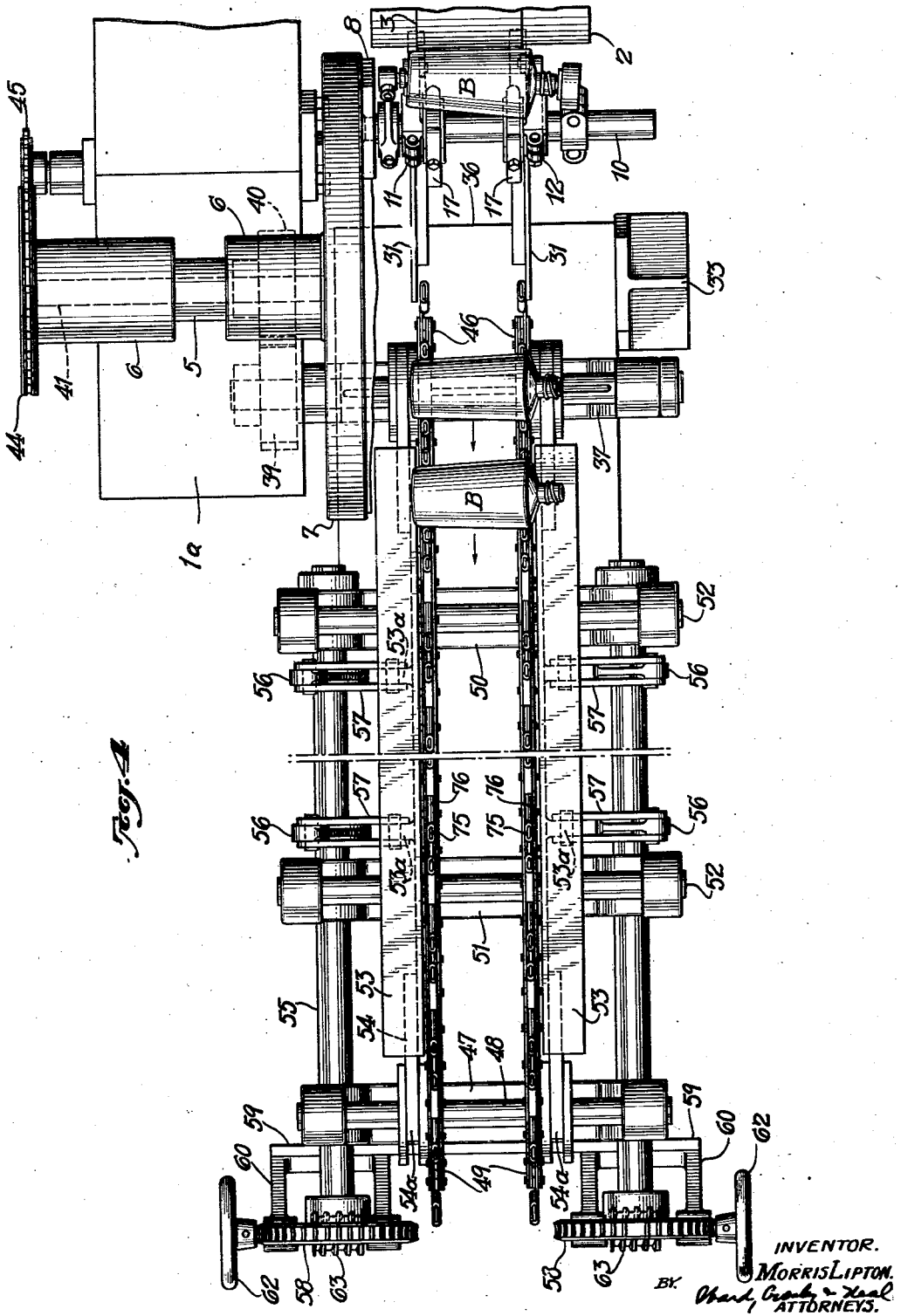

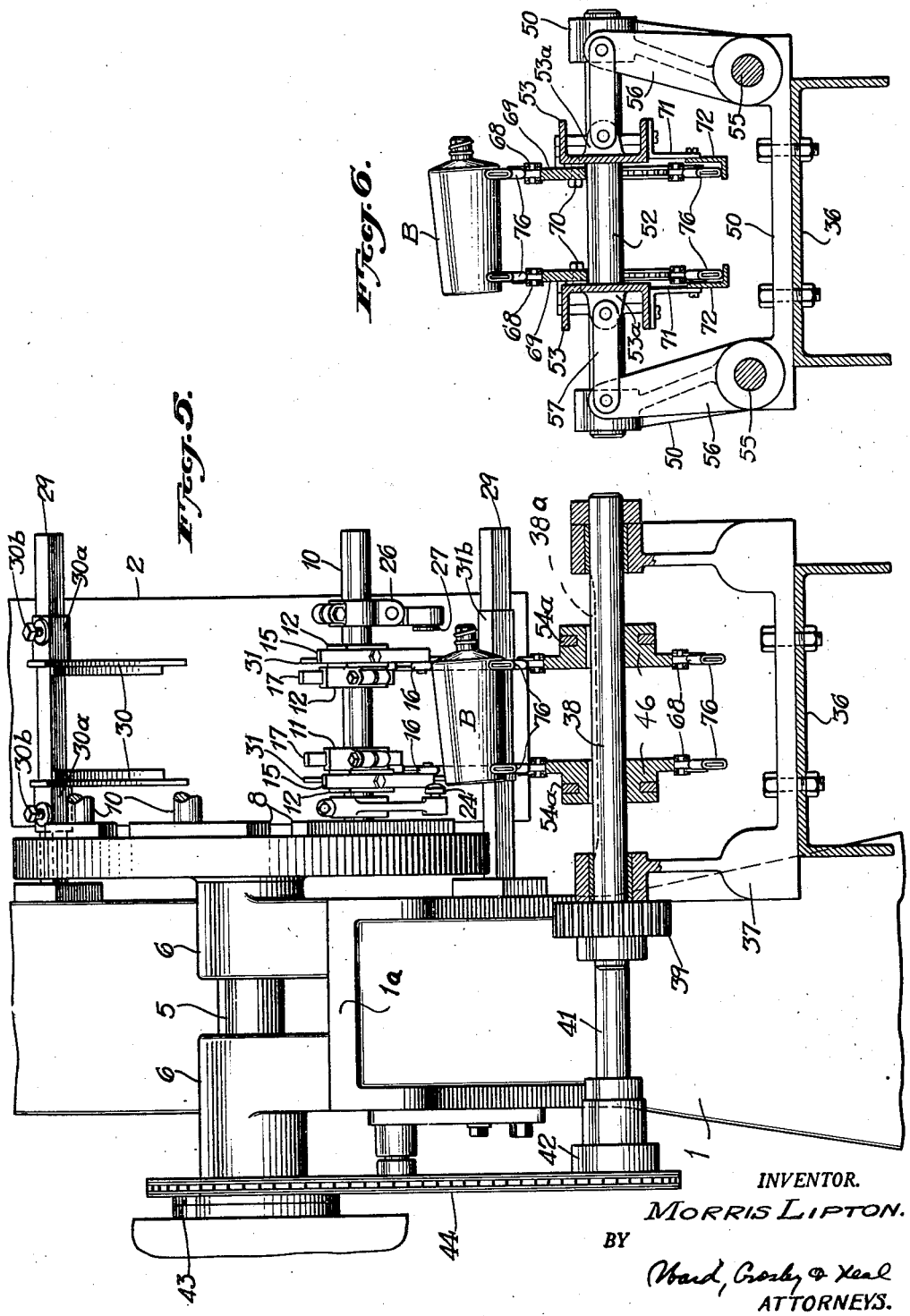

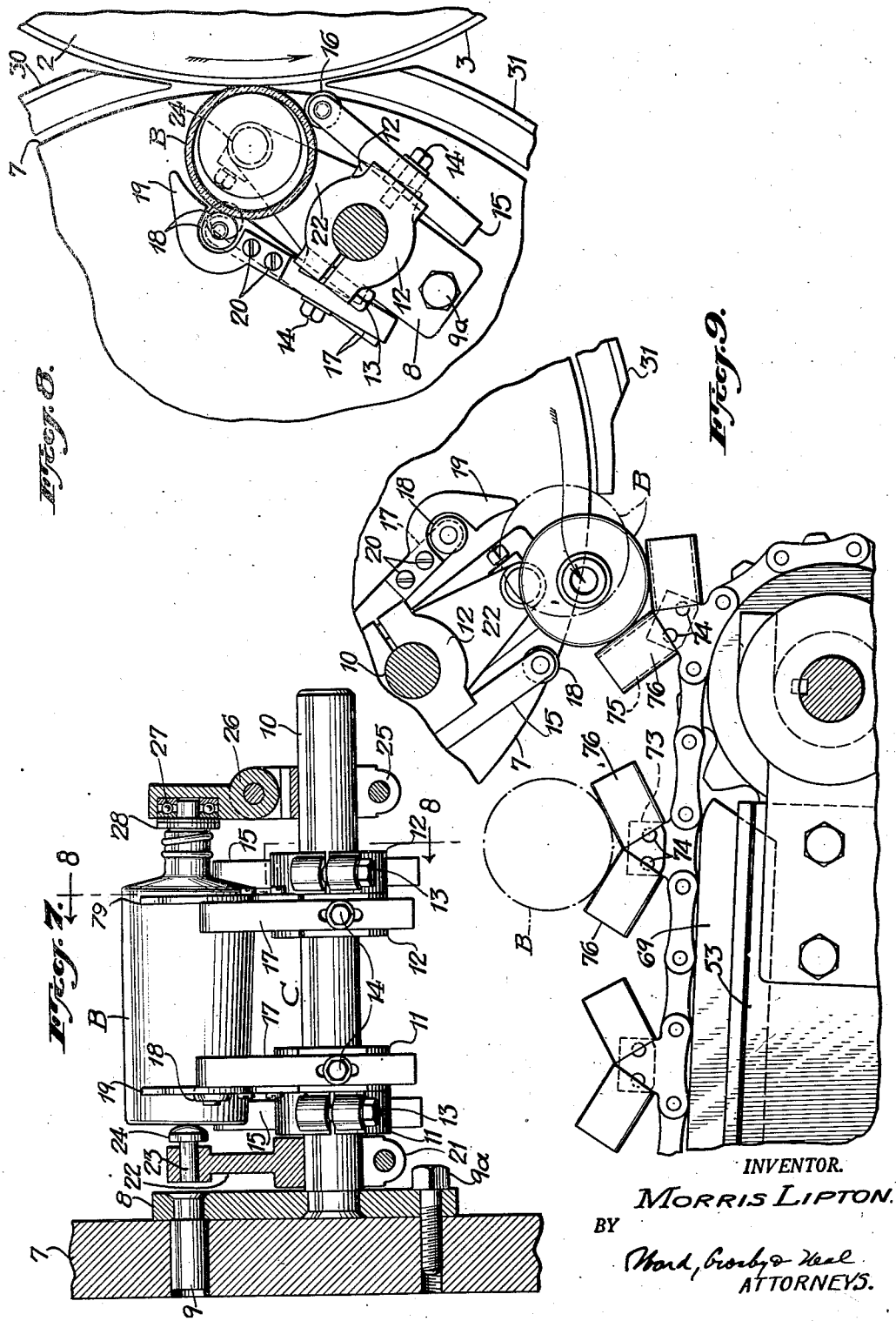

2,432,024

UNITED STATES PATENT OFFICE 2,432,024

VARIABLE WIDTH CONVEYOR

Morris Lipton, Rutherford, N. J., assignor to Sun Chemical Corporation, a corporation of Delaware Original application November 29, 1941, Serial No. 420,948. Divided and this application June 27, 1944, Serial No. 542,295

4 Claims. (Cl. 198—117)

My invention relates to a conveyor means for transporting articles into, through and from a printing zone; more particularly, the aforesaid conveyor means comprises article-supporting chucks mounted on an intermittently movable disk and an endless conveyor movable step-by-step for receiving printed articles from the respective chucks.

In accordance with my invention, a conveyor comprising an intermittently movable disk as referred to above is combined with an endless conveyor which receives the printed articles and transports them from the printing press.

Further in accordance with my invention, the aforesaid endless conveyor comprises a pair of assemblies mounted on supporting members for transverse adjustment with respect to each other, each assembly comprising sprocket wheels and a cooperating endless sprocket chain.

Various other objects, advantages and features of my invention will become apparent from the following detailed description.

My invention resides in the conveyor, combined conveyors, features and arrangements of the character hereinafter described and claimed.

This application is a division of application Serial No. 420,948, filed November 29, 1941.

For an understanding of my invention and for an illustration of one of the forms thereof, reference is to be had to the acompanying drawings, in which:

Figure 1 is a front elevational view showing the combined printing press and conveyor means of my invention;

Fig. 2 is an end view of the mechanism shown in Fig. 1;

Fig. 3 is a transverse, vertical sectional view, partly in elevation, taken on the line 3—3 of Fig. 2 looking in the direction of the arrows;

Fig. 4 is an enlarged plan view of the mechanism shown in Fig. 1;

Figs. 5 and 6 are transverse, vertical sectional views, partly in elevation, taken on the respective lines 5—5 and 6—6 of Fig. 1 looking in the direction of the arrows;

Fig. 7 is an enlarged sectional view, partly in elevation, showing details of my novel chuck;

Fig. 8 is a transverse sectional view, partly in elevation, taken on the line 8—8 of Fig. 7 looking in the direction of the arrows; and Fig. 9 is an enlarged elevational view partly in section, showing features of the invention.

Referring to Fig. 1, P represents a suitable printing press which is herein shown as comprising a base 1 on which is journalled a blanket cylinder 2 carrying an arcuate rubber blanket 3. Disposed adjacent the blanket cylinder 2 and in driven relation with respect thereto is a plate cylinder 4 which carries a printing plate, not shown, to which ink is applied by any suitable inking arrangement, not shown.

A printing arrangement of the general character hereinbefore described is illustrated in a detailed manner in U. S. Letters Patent to A. J. Ford No. 1,092,830. More specifically, the aforesaid printing arrangement is of the type under present commercial production by the Rutherford Machinery Co. and known as a Tube printing machine.

When the operating motor for the printing press P is energized, the blanket cylinder 2 is caused to rotate in a counter-clockwise direction, Fig. 1, at a desired constant speed. Responsive to the rotation of the blanket cylinder 2, the plate cylinder 4 rotates in a clockwise direction, Fig. 1, to thereby apply an impression of the printing plate to the rubber blanket 3 once for each rotative cycle of the blanket cylinder 2, these impressions always being applied to the same area of said rubber blanket 3.

As shown in Figs. 1, 4 and 5, a shaft 5 is journalled in bearings 6 upstanding from an extension 1a of the aforesaid base 1. Under the control of the known Geneva Movement mechanism forming a part of the printing press, steps of rotative movement are applied to the shaft 5, each step of rotative movement, in the form of the invention herein shown, being through an angle of sixty degrees. Secured to one end of the shaft 5 is a disk 7 which, with the form of the invention herein shown, carries six chucks C of duplicate character as hereinafter described.

Each of the chucks C comprises a plate 8 secured to the disk 7 by a pin 9 and a screw 9a, or equivalent, Fig. 7. The plate 8 supports a member 10 which extends at right angles to the plane of the disk 7. The member 10 carries two pairs of split collars 11, 11 and 12, 12, each collar being held in a desired adjusted position on the member 10 by a locking screw 13. Each of the aforesaid collars comprises a plane surface, the plane surfaces of the respective collars 11, 11 being located substantially at opposite sides of the member 10 and the plane surfaces of the respective collars 12, 12 being located in the same manner.

A screw 14 is threaded into the plane surface of each of the collars 11, 11 and 12, 12. The screws 14 which are associated with the respective outer collars 11 and 12 secure bars 15 thereto, respectively, each bar 15 being provided with a slot through which the attaching screw 14 extends and these slots preferably being elongated so that the pair of bars 15 may be adjusted transversely with respect to the member 10 while they are maintained in parallel relation with each other, Fig. 7. Each of the bars 15, when positioned as shown in Fig. 8, carries a metal roller 16 at the upper end thereof.

The screws 14 which are associated with the respective inner collars 11 and 12 secure bars 17 thereto, respectively, the bars 17 being adjustably mounted in the same manner as described above with respect to the bars 15. The bars 17, when positioned as shown in Fig. 8, carry the respective metal rollers 18 at the upper ends thereof and said last named end of each of the bars 15 has an article-supporting member 19 secured thereto by screws 20.

As shown in Fig. 7, the member 10, between the chuck C and the plate 8, has secured thereto a split collar 21 which comprises a radial arm 22 having a passage within which is clamped the shank of a bolt 23 having a head 24.

The member 10, at the side of the chuck C opposite the arm 22, has secured thereto a split collar 25 in which is clamped one end of an arm 26 having a recess alined longitudinally with the aforesaid bolt 23. Disposed within this recess is an anti-friction structure 27, the rotatable element of which has secured thereto a disk 28 utilizable as hereinafter described.

Referring particularly to Figs. 4 and 5, the base extension 1a is shown as having a pair of members 29 secured thereto and projecting therefrom in parallel relation, these members 29 being disposed closely adjacent the periphery of the disk 7, Fig. 1. Carried by the upper member 29 are a pair of curved tracks 30, the upper ends of the tracks 30 terminating in the respective sleeves 30a which are freely slidable on said upper member 29, each sleeve 30a being maintained in a desired adjusted position by a locking screw 30b. As shown in Fig. 1, the tracks 30 extend downwardly and terminate just short of the blanket cylinder 2.

Supported by the lower member 29 are a pair of curved tracks 31 carrying, approximately midway between the ends thereof, the respective sleeves 31a which are freely slidable on said lower member 29, each sleeve 31a being maintained in a desired adjusted position by a locking screw 31b. The tracks 31 extend upwardly and terminate just short of the blanket cylinder 2. In addition, the tracks 31 extend downwardly and terminate in a discharge position as hereinafter described.

In accordance with my invention, articles of any suitable character may receive printed impressions. In general, such articles are containers such as cans or bottles having side wall structures which receive the printing impressions and which are capable, inherently, of resisting the thrust of the printing member without becoming deformed. I have herein illustrated a bottle B as the article which receives the printing impression and as the term "bottle" is used hereinafter in this specification and in the appended claims, it shall be understood that the same is generically descriptive of true bottles, cans, containers or the like.

In operation, the disk 7 rotates by sixty-degree steps in a clockwise direction, Fig. 1. As each chuck C remains stationary in a loading position L, Fig. 1, a bottle B is deposited by an operator on the four metal rollers 16 and 18 of that chuck C in the loading position. Each chuck C comprises a pair of the supporting members 19 which serve to prevent accidental or unintended dislocation of the bottle B from the rollers 16 and 18.

After a bottle B has been loaded onto a chuck C, the latter moves to an idle position I, Fig. 1, and then to the printing position P. While moving between the positions I and P, the bottle B is opposite the tracks 30 which should have been so adjusted on the upper member 29 that the vertical surfaces 30c are opposite the respective ends of the body of the bottle B. Accordingly, as the bottle moves from the position I toward the position P, the track surfaces 30c serve to prevent movement of the bottle from its chuck in case that action should tend to occur.

When the bottle B reaches the position P, it remains stationary in that position while the printing operation proceeds. While in the position P and as shown in Fig. 4, the surface or element of the bottle which faces the blanket cylinder 2 should be tangent with respect thereto and should extend parallel to the longitudinal axis of said blanket cylinder 2. The bottle is caused to take this proper position in its chuck C by adjustment previously effected on the chuck bars 15 and 17.

The bottle B herein illustrated is one which has a conical body and, therefore, as shown in Fig. 7, it is necessary to open the set of bars 15, 17 at the left to somewhat greater extent than the opening defined by the set of bars 15, 17 at the right. This is accomplished by retracting the locking screws 13 of the collars 11 and 11, adjusting these collars circumferentially, and longitudinally if necessary, of the member 10 to properly position said first named set of bars 15 and 17; and then tightening said locking screws 13. Should adjustment be required of the set of bars 15, 17 at the right, Fig. 7, that operation may be effected in a manner similar to that described above. Further, if necessary or desirable, any or all of the screws 14 may be retracted whereupon any or all of the bars 15 and 17 may be adjusted with respect to the supporting collars therefor. After this has been done, the previously retracted screws 14 should be tightened.

Assuming that the chuck bars have been properly adjusted in the general manner described above, the bottle B, when in the printing position P, is supported as shown in Figs. 4 and 8. The timing is such that, soon after the bottle B takes this position, the printing blanket 3 of the blanket cylinder 2, which rotates constantly in a counterclockwise direction, Fig. 1, engages the bottle and causes the same to rotate in a clockwise direction, Fig. 8. In so doing, the blanket 3 contacts with the entire outer surface of the body of the bottle B to thereby apply the printing representation thereto.

As will be observed from Fig. 8, the rollers 16 and 18, in effect, form a cradle by which the bottle is supported while pressure and rotative movement is applied thereto by the blanket 3. The glass wall structure of the bottle B is of such character that fracture or deformation does not occur as a result of the applied pressure from the blanket 3.

The bolt 23 and the disk 28 are positioned opposite the bottle bottom and top, respectively, so as to form stop surfaces preventing undesired longitudinal movement of the bottle while the printing operation proceeds. When the bottle is of conical shape as illustrated, the pressure of the printing blanket 3 causes the same to move from left to right, Fig. 7. In so doing, the neck of the bottle engages the freely rotatable disk 28 which effectively prevents further longitudinal movement of the bottle. With non-conical bottles, this action is not so important.

After the printing blanket 3 passes beyond the printing position, the chuck C containing the printed bottle is given two steps of movement by the disk 7, the first step ending in the idle position $I_1$ and the second step ending in the discharge position D. While moving from the position P to the position D, the bottle is retained in its chuck C by the vertical surfaces 31c of the tracks 31 which are positioned in parallel relation with respect to the tracks 30 when the latter are positioned as described above.

It will be understood that the chucks C all have the same adjustments applied thereto for a given lot of duplicate bottles B each of which is to receive a printed impression. The disk 7 moves step-by-step in a clockwise direction, Fig. 1, and, after each chuck arrives at the position L, a bottle is deposited therein. The loaded chuck then carries the bottle to the first idle position I, then to the printing position P, then to the second idle position $I_1$, and then to the discharge position D where the bottle is removed from the chuck. Thereafter, the last named chuck moves to another idle position $I_2$ and then returns to the loading position L.

With the form of the invention herein disclosed, each bottle, as it is removed from its chuck at the discharge position D, is automatically passed onto a conveyor of a character hereinafter to be described.

As shown in Fig. 1, the base 1 supports a standard structure 33 and, in longitudinal alinement therewith, a U-shaped bracket 34 rests upon the floor or other supporting surface. Suitably secured to the bracket 34 are the parallel upstanding standards 35, Fig. 2. The standard structure 33 and the standards 35 have secured thereto in suitable manner a channel beam 36 extending generally in a horizontal direction.

Referring particularly to Figs. 1 and 5, the channel beam 36, at the end thereof toward the right, Fig. 1, is shown as supporting a U-shaped bracket 37 having vertical arms which form bearings for a horizontal shaft 38 carrying a gear wheel 39 at one end thereof. The gear wheel 39 meshes with a gear wheel 40, Fig. 4, which is carried by one end of a shaft 41 journalled in bearings formed in the aforesaid base extension 1a. The shaft 41, at the end thereof opposite the gear wheel 40, carries a sprocket wheel 42 which is disposed in the same vertical plane with a sprocket wheel 43 carried by the hereinbefore described shaft 5. An endless sprocket chain 44 engaged by a tightener sprocket wheel 45, Fig. 4, coacts with the sprocket wheels 42 and 43.

As hereinbefore stated, the shaft 5 is rotated in a step-by-step manner under the control of the printing press motor. The shaft 5, by the sprocket chain 44, rotates the shaft 41 in similar fashion and, by the gear wheels 40 and 39, the shaft 38 is rotated in step-by-step manner under the control of the shaft 41.

As shown in Fig. 5, the shaft 38 carries a pair of sprocket wheels 46, 46 each of which comprises a member which is slidable in a slot 38a extending longitudinally of the shaft 38 whereby said sprocket wheels 46, 46 may be freely adjusted longitudinally of the shaft 38 in the manner hereinafter described.

Referring to Figs. 1, 2 and 4, the channel beam 36, at the end thereof toward the left, Fig. 1, is shown as supporting a second U-shaped bracket 47 having a base 47a which, as hereinafter described, is adjustable longitudinally of the channel beam 36, said bracket 47 having vertical arms which form bearings for a horizontal shaft 48. Carried by the shaft 48 are a pair of sprocket wheels 49, 49, each of which, the same as the aforesaid sprocket wheels 46 and 46, are splined to the shaft 48 whereby said sprocket wheels 49, 49 may be freely adjusted longitudinally of the shaft 48 in unison with the respective sprocket wheels 46, 46 as hereinafter described.

As shown particularly in Figs. 1, 4 and 6, the channel beam 36 supports third and fourth U-shaped brackets 50 and 51 which are disposed adjacent the respective brackets 37 and 47. Each of the brackets 50 and 51 carries a horizontal rod 52, these rods 52 serving as supports on which parallel channel members 53, 53 are freely movable for adjustment transversely of the conveyor.

As illustrated in Fig. 4, each end of each of the channel members 53, 53 carries a plate member 54 each of which terminates in a fork-shaped end 54a freely receivable in a groove formed in the periphery of the hub of the adjacent sprocket wheel 46 or 49.

In accordance with the invention, the brackets 47, 51 and 50 have a pair of parallel shafts 55, 55 journalled therein, these shafts being disposed outwardly of the respective channel members 53, 53. Each shaft 55 has a pair of arms 56 secured thereto for oscillatory movement therewith, these arms 56 being located closely adjacent the respective brackets 50 and 51, Fig. 1. The upper end of each arm 56 is connected by a pair of links 57 with an ear 53a formed integrally with the adjacent channel member 53. As shown in Figs. 1 and 4, each shaft 55 terminates in a worm wheel 58.

Referring to Figs. 1, 2 and 4, the channel member 36 is shown as having a plate 59 secured thereto, this plate 59, at opposite ends thereof, carrying the respective U-shaped brackets 60 in each of which is journalled a shaft 61 having a hand wheel 62 secured to one end thereof, said shaft 61, intermediate its ends, carrying a worm gear 63 which meshes with the adjacent worm wheel 58.

The plate 59, as shown in Figs. 1, 2 and 3, has two pairs of blocks 64 and 65 secured thereto by screws 66, or equivalent. The blocks 64 extend above the upper level of the plate 59 and each block 64 carries a screw 67, the screws 67 being threaded, respectively, into passages provided therefor in the above described base 47a of the bracket 47.

The sprocket wheels 46, 46 and 49, 49 are longitudinally alined in pairs for the reception of the endless sprocket chains 68 and 68, respectively. In order to prevent the upper spans of the chains 68, 68 from sagging, bars 69, 69 are secured to the upper surfaces of the respective channel members 53, 53 by bolts 70. Similarly, to prevent the lower spans of the chains 68, 68 from sagging, supporting angle members 71 are secured to the lower surfaces of the channel members 53 and 53, the angle members 71 carrying the angle members 72 and 72, the lower horizontal surfaces of which are engaged by bottle-supporting members carried by the respective sprocket chains as hereinafter more particularly described. It will be understood that the bars 69, 69 together with the angle members 72, 72 extend substantially the entire distance between the pairs of sprocket wheels 46, 46 and 49, 49.

In view of the foregoing description, it will be understood that the conveyor mechanism of my invention consists of two duplicate assemblies, each of which comprises a channel member 53, sprocket wheels 46 and 49, a sprocket chain 68 together with the sag-preventing supports for the upper and lower spans thereof. Further, these assemblies are freely movable toward or from each other by reason of the fact, first, that the sprocket wheels 46 and 49 are freely movable longitudinally of the respective shafts 38 and 48 and, second, that the channel members 53, 53 are freely movable on and with respect to their supporting rods 52.

In order to move one of the aforesaid assemblies with respect to the other assembly, the operator rotates that hand wheel 62 which is associated with the assembly to be moved to thereby rotate the associated shaft 55 by energy transmitted thereto through the intermeshed gear wheels 58 and 63. As a result, the arms 56 are moved either clockwise or counter-clockwise, Fig. 6, depending upon the direction of rotation of the hand wheel 62, to thereby move the channel member 53 either toward or from the other channel member 53. Obviously, the other assembly may be adjusted either toward or from the first named assembly by effecting movement of its hand wheel 62 in the proper direction. In this manner, the sprocket chains 68, 68 are positioned a desired distance from each other.

The sprocket chains 68, 68 may be tightened or loosened as desired by rotating the screws 67 in the proper direction, these screws coacting with the bracket base 47a whereby the bracket 47 and the pair of sprocket wheels carried thereby are moved either from or toward the other pair of sprocket wheels.

As indicated particularly in Fig. 9, each third link of each of the sprocket chains 68, 68 comprises an outwardly extending supporting member 73 to which, by screws or the like 74, is secured a V-shaped member 75 having a tube 76 formed from rubber or the like on each leg thereof. As indicated in Fig. 4, the members 75 on the two sprocket chains 68, 68 are alined in pairs transversely of the machine.

In accordance with the invention, the conveyor comprising the chains 68, 68 is so positioned that the pairs of members 75 pass beneath the discharge position D as the upper spans of the sprocket chains move step-by-step from right to left, Fig. 1. Further, the timing is such that each transversely alined pair of the members 75 arrives at the position D at the same time as a chuck C. As shown in Figs. 1 and 9, the tracks 31 terminate at the position D in such manner that a bottle B drops from the chuck with which it has been associated and comes to rest upon a pair of the transversely alined members 75 as the latter come to rest in said position D. In response to the next succeeding steps of the disk T and the conveyor chains 68 and 68, the bottle B which has just been deposited on said last named members 75 moves one step on its journey from right to left, Figs. 1 and 9, and the next pair of transversely alined members 75 move into the position D and receive a bottle B from the following chuck on the disk 8. In this manner, the bottles which receive printing impressions in the printing zone are removed individually from the chucks and deposited upon the conveyor chains 68 and 68, the latter serving to move the bottles from right to left, Fig. 1, so that an operator may conveniently remove and dispose of them as desired.

It will be understood that the hereinbefore described assemblies each of which comprises a channel member 53, sprocket wheels 46 and 49 and a sprocket chain 68 are transversely adjustable so that the V-shaped members 75 will arrive at the position D in proper relation with respect to each other and with respect to a bottle B as it descends from its chuck so that said bottle will be properly supported for movement from right to left, Fig. 1.

From a consideration of Fig. 6, it will be understood that the rubber tubes 76 associated with the V-shaped members 75 rest upon the angle members 72 to prevent sag of the lower spans of the sprocket chains 86, 86 as such lower spans move from left to right, Fig. 1.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a conveyor of the character described, a base having end and intermediate brackets upstanding therefrom, rotatable shafts carried by the end brackets respectively, rods carried by the intermediate brackets respectively, a pair of assemblies transversely slidable on said rods, each assembly comprising a longitudinally extending member, sprocket wheels which are slidable on said shafts, respectively, together with an endless sprocket chain coactable with the longitudinally alined sprocket wheels, and means for transversely adjusting said assemblies with respect to each other.

2. In a conveyor of the character described, a base having end and intermediate brackets upstanding therefrom, rotatable shafts carried by the end brackets respectively, rods carried by the intermediate brackets respectively, a pair of assemblies transversely slidable on said rods, each assembly comprising a longitudinally extending member, sprocket wheels which are slidable on said shafts, respectively, together with an endless sprocket chain coactable with the longitudinally alined sprocket wheels, a shaft disposed at each side of the conveyor, connections between said shafts and said longitudinally extending members respectively, and means for rotating said shafts individually.

3. In a conveyor of the character described, supporting means, rotatable shafts and rods carried by said supporting means, said shafts and rods being disposed in parallel relation, a pair of assemblies, each assembly comprising a longitudinally extending member transversely slidable on said rods, sprocket wheels which are slidable on said shafts, respectively, together with an endless sprocket chain coactable with the longitudinally alined sprocket wheels, and means for effecting relative movement between said assemblies.

4. In a conveyor of the character described, supporting means, rotatable shafts and rods carried by said supporting means, said shafts and rods being disposed in parallel relation, a pair of assemblies, each assembly comprising a longitudinally extending member transversely slidable on said rods, sprocket wheels which are slidable on said shafts, respectively, together with an endless sprocket chain coactable with the longitudinally alined sprocket wheels, and means for moving said assemblies either toward or from each other, said last named means being operable to move said assemblies toward or from each other as desired.

MORRIS LIPTON.

REFERENCES CITED

The following references are of record in the file of this patent:

UNITED STATES PATENTS

| Number | Name | Date |
|---|---|---|
| 894,307 | Zofnass | July 28, 1908 |
| 907,790 | Hancock | Dec. 29, 1908 |
| 1,258,989 | Craig | Mar. 12, 1918 |
| 2,134,832 | Morrison | Nov. 1, 1938 |
| 2,307,976 | Walz et al. | Jan. 12, 1943 |
| 2,345,937 | Joa | Apr. 4, 1944 |